United States Patent
Tabei et al.

(12)

(10) Patent No.: US 6,358,295 B1
(45) Date of Patent: Mar. 19, 2002

(54) METHOD FOR PRODUCING GRANULAR COATED FERTILIZER

(75) Inventors: Nobuaki Tabei; Noriaki Saitou, both of Toyonaka; Kazuhisa Endo, Tsukuba, all of (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 09/798,905

(22) Filed: Mar. 6, 2001

(30) Foreign Application Priority Data

Mar. 15, 2000 (JP) ............................................. 12-072015

(51) Int. Cl.$^7$ ................................................ C05G 3/00
(52) U.S. Cl. ..................... 71/64.02; 71/64.07; 71/64.11
(58) Field of Search ............................. 71/64.02, 64.07, 71/64.11

(56) References Cited

U.S. PATENT DOCUMENTS 4,019,890 A * 4/1977 Fujita et al. ................. 71/64 F
5,652,196 A * 7/1997 Luthra et al. ................ 504/116

FOREIGN PATENT DOCUMENTS

| EP | 0 867 422 A2 | 9/1998 |
| JP | 9-309785 | 12/1997 |
| JP | 10-72272 | 3/1998 |

* cited by examiner

Primary Examiner—Chhaya D. Sayala
(74) Attorney, Agent, or Firm—Sughrue Mion, PLLC

(57) ABSTRACT

The present invention provides a method for producing a controlled-release coated fertilizer which provides few floats when applied in water, gives uniform coat and makes it possible to release fertilizer ingredient constantly in a short time at ordinary temperature to low temperature. The method comprises adding water-absorptive polymer to granular fertilizer and then coating it with at least one urethane resin layer.

4 Claims, No Drawings

METHOD FOR PRODUCING GRANULAR COATED FERTILIZER

FIELD OF THE INVENTION

The present invention relates to a method for producing controlled-release granular fertilizer coated with urethane resin.

BACKGROUND ART

A controlled-release fertilizer, which is also referred to as slow-release fertilizer, is labor-saving and releases a fertilizer ingredient according to a growth of a plant in a designated time. At the present day, various controlled-release fertilizers are suggested and put to practical use, because of ripening of age employed in agriculture, decrease of the number of the employed and increase of side-job farmers.

Japanese Unexamined Patent Publication Nos. Hei-9-309785 and Hei-10-72272 describe a controlled-release granular fertilizer, which is coated with a thermosetting resin and a highly water-absorptive resin for accelerating a dissolution rate.

A fertilizer coated with urethane resin is described in Japanese Unexamined Patent Publication No. Hei-10-291881. In this reference, described is a fertilizer coated with a mixture of a highly water-absorptive resin and urethane resin, and another fertilizer coated with only uncured urethane resin, after coated a surface of the fertilizer with a mixture of a highly water-absorptive resin and urethane resin, for suppressing early dissolution and affording sigmoide type dissolution.

However, a method for coating a surface of fertilizer with a mixture of a highly water-absorptive resin and urethane resin, and a method of coating with only urethane resin, after coating a surface of fertilizer with a mixture of a highly water-absorptive resin and urethane resin, give a large amount of fine particles coated with only highly water-absorptive resin. The production of the fine particles causes a trouble floating of a large amount of fine particles absorbing water when applied in paddy field as well as decreasing an effect accelerating dissolution rate by loss of the highly water-absorptive resin.

Though a thickness of the coated resin layer should be lowered for increasing dissolution rate without the highly water-absorptive resin, too thick coated layer makes it difficult to form a completely uniform layer and causes often defects such as pinhole. Further, it also causes defects of the layer by an addition of physical force for transportation, storage and application.

It is difficult to control the dissolution precisely by using these coated fertilizers comprising the disproportional or defective layer. Further, there is a problem of low yield of the manufactured articles having good quality.

An object of the present invention is to provide a method for producing a controlled-release granular coated fertilizer, which can release fertilizer ingredient in a short time at room temperature or lower temperature constantly, especially at low temperature, using the highly water-absorptive resin without loss, and suppressing the by-production of fine particles coated only the highly water-absorptive resin. It is also the object that few floats are found when the obtained fertilizer is applied into water and that the obtained fertilizer has a uniform coat layer.

SUMMARY OF THE INVENTION

The present invention is provided to attain the object described above. It is a method for producing a granular fertilizer which comprises adding water-absorptive polymer to granular fertilizer and then coating it with at least one urethane resin layer. The obtained fertilizer comprises few fine particles coated only the water-absorptive polymer, gives few floats when applied in water, and releases fertilizer ingredient in a short time at room temperature or even at lower temperature.

Namely, the present invention provides a method for producing granular coated fertilizer, which comprises adding water-absorptive polymer to granular fertilizer and then coating it with urethane resin, typically a method given by the following steps:

(1) adding water-absorptive polymer to the granular fertilizer;
(2) placing the granular fertilizer in a tumbled state;
(3) adding liquid uncured urethane resin to the tumbled granular fertilizer in an amount enough to secure a layer thickness of 1 to 10 µm;
(4) coating the surface of each granular fertilizer with the uncured urethane resin while keeping the granular fertilizer in the tumbled state;
(5) curing thermally the urethane resin while keeping the granular fertilizer in the tumbled state; and
(6) repeating the above steps (2) to (5) one or more times, in this order.

DISCLOSURE OF THE INVENTION

The present invention is described in detail hereinafter.

When the water-absorptive polymer is added to the granular fertilizer in the present invention, the method for adding the water-absorptive polymer to the granular fertilizer and making it uniformly is, for example, given by heating the granular fertilizer to the temperature suitable for processing, adding the water-absorptive polymer and making it tumbled to be uniform, or given by adding the water-absorptive polymer to the tumbled granular fertilizer, while heating the granular fertilizer to the temperature suitable for processing, to be uniform.

In a method of placing the granular fertilizer into the tumbling state, an apparatus is not specifically limited and a known conventional apparatus can be used and examples thereof include rotary pan, rotary drum and the like. An apparatus with a heating equipment is suitable for realization of high accuracy of coating and adjustment of a processing time.

The granular fertilizer used in the present invention may be any conventional granular fertilizer. Specific examples thereof include nitrogen fertilizer such as urea, ammonium sulfate, ammonium chloride, ammonium phosphate, ammonium nitrate, ammonium nitrate lime, lime nitrogen, sodium nitrate and acetaldehyde condensed urea; phosphate fertilizer such as calcined phosphate, processed phosphate fertilizer, triple superphosphate and mixed phosphate fertilizer; potash fertilizer such as potassium chloride, potassium sulfate magnesia, potassium bicarbonate and potassium silicate fertilizer; complex fertilizer such as potassium phosphate fertilizer and potassium nitrate fertilizer; organic fertilizer; and granular fertilizer obtained by granulation of a mixture of these fertilizers using a per se known method.

A particle diameter of the granular fertilizer used in the present invention is not specifically limited, but is preferably within a range from 1 to 5 mm in view of manufacturing.

In the present invention, water-absorptive polymer means a polymer which is practically insoluble in water and can absorb and keep water in an amount of 2 to 2000 times by weight of the polymer. Water-absorptive resins can be used as the water-absorptive polymer.

Examples of the water-absorptive resin include acrylate polymers (typically, sodium polyacrylate) such as Sumikagel N-100, N-100P, N-100SH and NP-1010 manufactured by Sumitomo Chemical Co., Ltd., Aquakeep 10SH-P, 10SH, 10SH-NF, SA60S and SA60NTYPEII manufactured by Sumitomo Seika Chemicals Co., Ltd., and Aquaric CS-6 and CS-7 manufactured by Nippon Shokubai Co., Ltd.; acrylic acid-vinyl alcohol copolymers such as Sumikagel S-50, S-110, S-120, S-510 and S-520 manufactured by Sumitomo Chemical Co., Ltd.; isobutylene polymers such as KI gel-210K-F2 manufactured by Kuraray Co., Ltd.; ethylene oxide polymers; propylene oxide polymers; ethylene oxide-propylene oxide copolymers; and polyethylene oxide resins bonded with urethane resin at the hydroxy group terminal such as Aquacoak manufactured by Sumitomo Seika Chemical Co., Ltd. Further, examples of the water-absorptive polymer include starch, starch graft polymers, and carboxymethylcellulose salts such as sodium salt.

In the present invention, the urethane resin is a generic term of a resin, which is three-dimensionally cross-linked by reacting a polyisocyanate compound with a polyol compound. The uncured urethane resin in the present invention is a mixture of the polyisocyanate compound, the polyol compound and optionally a curing catalyst, and is obtained by mixing them without any reaction or by previously reacting a portion of them to such a degree that three-dimensional cross-linking does not occur. It is also a useful technique to add a catalyst in order to accelerate the curing reaction. The uncured resin may be in any form of solvent-free type, solution and aqueous emulsion, but is preferably in the form of solvent-free type and being liquid at the processing temperature.

The polyisocyanate compound is not specifically limited and specific examples thereof include toluenediisocyanate (TDI), diphenylmethanediisocyanate (MDI), naphthalenediisocyanate, tolidinediisocyanate, hexamethylenediisocyanate, isophoronediisocyanate, xylenediisocyanate and the like. If necessary, a mixture of them can also be used. Among them, MDI, TDI or an oligomer derived from them is preferably used.

The polyol compound is not specifically limited and includes, for example, polyether polyols obtained by additional polymerization of ethylene oxide or propylene oxide with alkanepolyol such as propylene glycol or trimethylolpropane using an amino alcohol or amine as an initiator; polyether polyols such as polytetramethylene ether glycol obtained by polymerization of tetrahydrofuran; polyester polyols obtained by reacting a polyether polyol, carboxylic acid compound and polyhydric alcohol or natural fat or oil having hydroxy groups such as isano oil and caster oil.

The NCO/OH equivalent ratio of the used polyisocyanate and polyol is usually in the range of 0.9 to 1.2.

As a curing catalyst of the urethane resin, known conventional catalysts can be used. Specific examples thereof include alkali compounds such as sodium hydroxide, potassium hydroxide and so on; organotin compounds such as dibutyltin laurate, dibutyltin maleate and so on; urea; triethylenediamine; N-methylmorpholine; N,N-dimethylmorphiline; diazabicycloundecene; imidazole; ethylimidazole; diazabicyclooctane; 2,4,6-tris(dimethylaminomethyl)phenol. Among them, an amine catalyst is preferably used. These catalysts are used as they are, or in the form of an aqueous solution or suspension. A solid catalyst is preferably used in the form of a ground powder.

Further, pigment or dyestuff for coloring, inorganic/organic powders or granules such as talc, mica, silica, carbon black, resin powder and so on for filler can be used, if necessary.

Furthermore, clay or surfactant can be added, if necessary.

A used amount of the water-absorptive polymer depends on its granular diameter, and is usually from 0.01 to 50 parts by weight based on 100 parts by weight of the urethane resin. When the amount is smaller than 0.01 part by weight, the effect of retarding the dissolution rate of the fertilizer may be insufficient. On the other hand, when the amount is larger than 50 parts by weight, the dissolution rate may be too fast. The amount is preferably from 0.1 to 30 parts by weight, and more preferably from 1 to 20 parts by weight.

The granular coated fertilizer of the present invention has more accelerated dissolution rate of the fertilizer than the similar granular coated fertilizer without the water-absorptive polymer at low temperature.

The accelerating state can be confirmed by weighing a designated amount of a test sample, adding water thereto, keeping it in water at a designated temperature, measuring a concentration of the fertilizer in water by an analytical device and calculating the dissolution amount of the fertilizer out of the coated fertilizer.

Next, the method for producing the granular coated fertilizer of the present invention is explained in more detail.

Namely, the method is usually performed by the following steps:

(1) adding a water-absorptive polymer to a granular fertilizer and dispersing it uniformly;

(2) placing the granular fertilizer in a tumbled state;

(3) adding liquid uncured urethane resin to the tumbled granular fertilizer in an amount enough to secure a layer thickness of 1 to 10 $\mu$m;

(4) coating the surface of each granular fertilizer with the uncured urethane resin while keeping the granular fertilizer in the tumbled state;

(5) curing thermally the urethane resin while keeping the granular fertilizer in the tumbled state; and (6) repeating the above steps (2) to (5) one or more times, in this order.

In the step (3) described above, the liquid uncured urethane resin can be combined and mixed with a curing agent or catalyst in advance. Further, the step (3) can also be carried out by adding the liquid uncured urethane resin, curing agent, catalyst and so on separately, and mixing them while coating the granular fertilizer with resin. The addition of the liquid uncured urethane resin can be carried out by dropping, spraying or the like.

The step (5) described above is usually carried out by heating the uncured urethane resin to a temperature that is enough to make the gel time within 5 minutes, preferably within 3 minutes. The temperature is usually 50–100° C., preferably 65–85° C.

The amount of the resin to be incorporated at a time is adjusted so that a coating film thickness is from 1 to 10 $\mu$m, preferably 2 to 6 $\mu$m. When the film thickness is less than 1 $\mu$m, the number of coating times is too large and it becomes disadvantageous industrially. On the other hand, when the film thickness is more than 10 $\mu$m, the following problem arises. That is, in the method of the present invention, when a liquid uncured urethane resin is incorporated in a fertilizer in a tumbled state, a uniform uncured urethane resin layer is first formed on the surface of granules by tumbling the granules and, at the same time, the curing reaction of the urethane resin proceeds. In this case, thickening of the urethane resin gradually occurs along with the reaction and the urethane resin comes to have spinnability. Further, adhesion of the urethane resin increases and the fertilizer granules are adhered each other to form a mass of a lot of granules and, therefore, the mass can not be taken apart into original primary granules. Even if the mass can be taken apart into the particles, there is a fear of damaging the resin surface. When the film of the urethane resin is more than 10 $\mu$m, the problem as described above occurs and it is difficult to coat each granule uniformly with the cured urethane resin. In case of coating with a thick urethane resin film at a time, defects described above are caused by a conventional tumbling type coating method and it is difficult to produce a desired granular coated fertilizer.

In the step as described above, the granular fertilizer coated with the uncured urethane resin is maintained in the tumbling state as it is and then the urethane resin is cured. The term curing used herein does not require complete curing and it refers to a state where the resin becomes free from spinnability by passing through a gel point. In such a state, the granules are not agglomerated each other along with the adhesion of the urethane resin and are easily ground and, therefore, a next uncured urethane resin can be added. As far as this object can be accomplished, the urethane resin component may be added to the fertilizer, intermittently or continuously. The final coated fertilizer may be sufficiently maintained at a curing temperature to perform complete curing of the resin, if necessary.

According to the production method of the present invention, a granular fertilizer have all the amount of the water-absorptive polymer in the film and no defect of coating can be obtained by repeating the above steps a plurality of times, optionally 10 to 12 times. It is also a useful technique to add inorganic fine powders such as clay to the surface of the coated fertilizer for the purpose of preventing agglomeration of the fertilizer and preventing flotation on fertilizer application.

The granular coated fertilizer of the present invention can be applied in the area having relatively low temperature or in the season of relatively low temperature from autumn to spring, as well as at room temperature. Especially, it can release the fertilizer ingredient in a short time even at low temperature. Further, it can be used as a fertilizer for culturing laver in saline.

EXAMPLES

The following examples illustrate the present invention in further detail but are not to be construed to limit the scope thereof.

The evaluation of the fertilizer dissolution was conducted by the method (e.g. "Detailed Explanation of Fertilizer Analysis", edited by Masayoshi KOSHINO, 1988) proposed by Environmental Technical Laboratory of the Ministry of Agriculture, Forestry and Fisheries in Japan.

Namely, 7.5 g of a test sample is charged in a bottle and 100 ml of water is added thereto. After maintaining the sample at a designated temperature for designated days, 0.5 ml is taken and a concentration of urea in water is analyzed by emission spectrography. As a result, dissolution amount of the urea from the coated granules is traced and the dissolution behavior is observed.

Example 1

In a temperature-controllable concrete mixer equipped with a hot-air generator, 5 kg of a granular urea (average particle diameter: 3. mm) was charged and a granular urea was placed into a tumbling state by rotating at 20–30 rpm. The temperature of the charged granular urea is maintained at 70–75° C. by heating the mixer, thereby to maintain the tumbling state. After the ventilation was stopped, 15 g of a water-absorptive polymer [Aquakeep 10SH-P (average particle diameter: 200–300 $\mu$m) manufactured by Sumitomo Seika Chemicals Co., Ltd.] was added to the urea quickly and maintained the tumbling state to make it dispersed. Then, 11.8 g of Polymeric MDI (commercial name: Sumidule 44V10, manufactured by Sumitomo Bayer Urethane Co., Ltd.) and 13.1 g of a branched polyether type polyol (commercial name: Sumifen TM, manufactured by Sumitomo Bayer Urethane Co., Ltd.) as a coating resin and 0.3 g of 2,4,6-tris(dimethylaminomethyl)phenol as an amine catalyst were mixed with stirring to give an uncured urethane resin, which was quickly added to the tumbling granular urea. The uncured urethane resin was liquid at room temperature.

The amount of the resin charged was 0.5% by weight based on the fertilizer and the film thickness of the coating resin was about 3.1 $\mu$m.

It was confirmed by a visual observation that the surface of the granular fertilizer is coated with the charged resin, almost uniformly, over about 30 seconds. Three minutes after charging the resin, a portion of the sample was taken out. As a result of observing the portion, the resin was in a state of being free from adhesion. After the above step (the addition of the uncured urethane resin) was repeated 3 times every three minutes, the ventilation was restarted and the above step was repeated 17 times to coat the fertilizer with the resin in the amount of 10% by weight. Finally, the granular fertilizer coated with the resin was maintained at 70–75 C. for 3 minutes to completely cure the resin, thereby obtaining a granular fertilizer coated with a urethane resin.

No fine particles coating Aquakeep were obtained in the mixer from which the granular coated fertilizer taken. Further, almost no floats were observed in a test for confirming a float in water.

Examples 2–13

In the same operation as in Example 1 except for changing the amount of the used urethane resin and kind of the used water-absorptive polymer was made the method shown in Tables 1, 2 and 3. In Examples 4, 7, 10 and 13, no fine particles coating the water-absorptive polymer were observed in the mixer. Further, almost no floats were observed in a test for confirming a float of the granular coated fertilizer of Examples 2–13 in water.

A change in dissolution percentage of a urea fertilizer with a lapse of time of these samples in water (25° C. and 15° C.) was traced. The dissolution behavior of the fertilizer is shown in Tables 1, 2 and 3.

In Tables 1, 2 and 3, the coating amount (% by weight based on the fertilizer) represents a percent amount by weight of the urethane resin based on the weight of the urea fertilizer and the amount of the used water-absorptive polymer (% by weight based on the fertilizer) represents an amount (% by weight) of the water-absorptive polymer based on the weight of the urea fertilizer. The water-absorptive polymers are acrylate salt type polymers [commercial name : Aquakeep 10SH-P (average particle diameter: described above), commercial name Aquakeep 10SH-P (average particle diameter: 200–300 $\mu$m), Aquakeep 10SH-NF (average particle diameter: 20–30 $\mu$m) manufactured by Sumitomo Seika Chemicals Co., Ltd.] and acrylic acid-vinyl alcohol copolymers [commercial name: Sumikagel SP-510 (average particle diameter: 10 $\mu$m) manufactured by Sumitomo Chemical Co., Ltd.].

TABLE 1

| Examples | Water-absorptive polymer Commercial name | Added amount | Coating amount | Dissolution temperature (° C.) | Dissolution rate (%) 5 days | 9 days | 12 days | 21 days | 30 days | 43 days | 51 days | 64 days | 78 days | 56 days | 104 days |
|---|---|---|---|---|---|---|---|---|---|---|---|---|---|---|---|
| 1 | Aqua keep 10SH-P | 0.3 | 10 | 25 | 5 | 9 | 12 | 22 | 36 | 55 | 69 | 84 | | | |
| 2 | Aqua keep 10SH-P | 0.3 | 8 | 25 | 20 | 33 | 41 | 59 | 72 | 83 | | | | | |
| 3 | Aqua keep 10SH-P | 0.3 | 6 | 25 | 52 | 70 | 78 | | | | | | | | |
| 1 | Aqua keep 10SH-P | 0.3 | 10 | 15 | 3 | 6 | 8 | 13 | 21 | 33 | 40 | 52 | 63 | 71 | 83 |
| 2 | Aqua keep 10SH-P | 0.3 | 8 | 15 | 11 | 20 | 28 | 43 | 56 | 67 | 74 | 83 | | | |
| 3 | Aqua keep 10SH-P | 0.3 | 6 | 15 | 33 | 53 | 61 | 79 | | | | | | | |
| 4 | Aqua keep 10SH-P | 0.5 | 10 | 25 | 15 | 21 | 25 | 34 | 47 | 66 | 76 | 87 | | | |
| 5 | Aqua keep 10SH-P | 0.5 | 8 | 25 | 34 | 48 | 54 | 65 | 77 | | | | | | |
| 6 | Aqua keep 10SH-P | 0.5 | 6 | 25 | 73 | 82 | | | | | | | | | |
| 4 | Aqua keep 10SH-P | 0.5 | 10 | 15 | 7 | 11 | 15 | 22 | 27 | 43 | 52 | 66 | 78 | 84 | |
| 5 | Aqua keep 10SH-P | 0.5 | 8 | 15 | 27 | 41 | 47 | 60 | 66 | 77 | 83 | | | | |
| 6 | Aqua keep 10SH-P | 0.5 | 6 | 15 | 60 | 75 | 79 | | | | | | | | |

TABLE 2

| Examples | Water-absorptive polymer Commercial name | Added amount | Coating amount | Dissolution temperature (° C.) | Dissolution rate (%) 7 days | 18 days | 26 days | 40 days | 46 days | 60 days | 70 days |
|---|---|---|---|---|---|---|---|---|---|---|---|
| 7 | Aquakeep 10SH | 0.1 | 10 | 25 | 5 | 18 | 24 | 52 | 60 | 73 | 82 |
| 8 | Aquakeep 10SH | 0.1 | 8 | 25 | 14 | 35 | 44 | 71 | 77 | 85 | |
| 9 | Aquakeep 10SH | 0.1 | 6 | 25 | 25 | 54 | 62 | 84 | | | |

| Examples | Water-absorptive polymer Commercial name | Added amount | Coating amount | Dissolution temperature (° C.) | Dissolution rate (%) 12 days | 20 days | 32 days | 40 days | 46 days | 60 days | 74 days | 88 days | 103 days | 119 days |
|---|---|---|---|---|---|---|---|---|---|---|---|---|---|---|
| 7 | Aquakeep 10SH | 0.1 | 10 | 15 | 5 | 5 | 15 | 23 | 30 | 43 | 57 | 68 | 76 | 82 |
| 8 | Aquakeep 10SH | 0.1 | 8 | 15 | 18 | 21 | 36 | 44 | 50 | 62 | 74 | 82 | | |
| 9 | Aquakeep 10SH | 0.1 | 6 | 15 | 28 | 36 | 54 | 63 | 69 | 78 | 88 | | | |

| Examples | Water-absorptive polymer Commercial name | Added amount | Coating amount | Dissolution temperature (° C.) | Dissolution rate (%) 7 days | 18 days | 26 days | 40 days | 46 days | 60 days | 70 days | 82 days |
|---|---|---|---|---|---|---|---|---|---|---|---|---|
| 10 | Aquakeep 10SH-NF | 0.5 | 10 | 25 | 2 | 12 | 23 | 59 | 69 | 84 | | |
| 11 | Aquakeep 10SH-NF | 0.5 | 8 | 25 | 6 | 24 | 39 | 72 | 80 | | | |
| 12 | Aquakeep 10SH-NF | 0.5 | 6 | 25 | 17 | 45 | 59 | 86 | | | | |

TABLE 2-continued

| Examples | Water-absorptive polymer Commercial name | Added amount | Coating amount | Dissolution temperature (° C.) | Dissolution rate (%) | | | | | | | | | |
|---|---|---|---|---|---|---|---|---|---|---|---|---|---|---|
| | | | | | 12 days | 20 days | 32 days | 40 days | 46 days | 60 days | 74 days | 88 days | 103 days | 119 days |
| 10 | Aquakeep 10SH-NF | 0.5 | 10 | 15 | 4 | 4 | 11 | 20 | 29 | 45 | 59 | 70 | 77 | 83 |
| 11 | Aquakeep 10SH-NF | 0.5 | 8 | 15 | 8 | 11 | 26 | 38 | 46 | 61 | 73 | 82 | | |
| 12 | Aquakeep 10SH-NF | 0.5 | 6 | 15 | 20 | 28 | 49 | 61 | 69 | 79 | 88 | | | |

TABLE 3

| Examples | Water-absorptive polymer Commercial name | Added amount | Coating amount | Dissolution temperature (° C.) | Dissolution rate (%) | | | | | | | | |
|---|---|---|---|---|---|---|---|---|---|---|---|---|---|
| | | | | | 5 days | 12 days | 17 days | 31 days | 35 days | 38 days | 42 days | 48 days | 54 days |
| 13 | Sumika gel SP510 | 0.1 | 10 | 25 | 10 | 15 | 19 | 43 | 49 | 57 | 62 | 71 | 81 |

| Examples | Water-absorptive polymer Commercial name | Added amount | Coating amount | Dissolution temperature (° C.) | Dissolution rate (%) | | | | | | | | |
|---|---|---|---|---|---|---|---|---|---|---|---|---|---|
| | | | | | 7 days | 17 days | 31 days | 40 days | 48 days | 56 days | 68 days | 82 days | 88 days | 102 days | 116 days |
| 13 | Sumika gel SP510 | 0.1 | 10 | 15 | 10 | 14 | 20 | 25 | 32 | 40 | 45 | 64 | 69 | 76 | 84 |

Comparative Example 1

In a temperature-controllable concrete mixer equipped with a hot-air generator, 5 kg of a granular urea (average particle diameter: 3. mm) was charged and a granular fertilizer was placed into a tumbling state by rotating at 20–30 rpm. The temperature of the charged granular urea is maintained at 70–75° C. by heating the mixer, thereby to maintain the tumbling state. Then, 11.8 g of Polymeric MDI (commercial name: Sumidule 44V10, manufactured by Sumitomo Bayer Urethane Co., Ltd.) and 13.1 g of a branched polyether type polyol (commercial name: Sumifen ™, manufactured by Sumitomo Bayer Urethane Co., Ltd.) as a coating resin, 1.25 g of a water-absorptive polymer [Aquakeep 10SH (average particle diameter: described above) manufactured by Sumitomo Seika Chemicals Co., Ltd.] and 0.3 g of 2,4,6-tris(dimethylaminomethyl) phenol as an amine catalyst were mixed with stirring to give an uncured urethane resin, which was quickly added to the tumbling granular urea. The above step was repeated 20 times every three minutes to coat the fertilizer with the resin in the amount of 10% by weight. The used total amount of the water-absorptive polymer was 0.5 part, namely 25 g, based on 100 parts of the fertilizer ingredient. Finally, the granular urea coated with the resin was maintained at 70–75° C. for 3 minutes to completely cure the resin, thereby obtaining a granular fertilizer coated with a urethane resin. After taking the granular coated urea from the mixer, 4.0 g of fine particles coating Aquakeep were found in the mixer. Therefore, it was found that a loss of Aquakeep was very large. Further, many floats were observed in a test for confirming a float in water.

What is claimed is:

1. A method for producing granular coated fertilizer, which comprises, in order, the following steps of:

(1) adding a water-absorptive polymer to a granular fertilizer;

(2) placing the granular fertilizer in a tumbled state;

(3) adding liquid uncured urethane resin to the tumbled granular fertilizer in an amount enough to secure a layer thickness of 1 to 10 $\mu$m;

(4) coating the surface of each granular fertilizer in the uncured urethane resin while keeping the granular fertilizer in the tumbled state;

(5) curing thermally the urethane resin while keeping the granular fertilizer in the tumbled state to form a urethane resin layer; and (6) repeating the above steps (2) to (5) one or more times, in this order.

2. The method according to claim 1, wherein the water-absorptive polymer is acrylate polymer, acrylic acid-vinyl alcohol copolymer, isobutylene polymer, ethylene oxide polymer, propylene oxide polymer, ethylene oxide-propylene oxide copolymer, polyethylene oxide resin bonded with urethane resin at the hydroxy group terminal, starch, starch graft polymer or carboxymethylcellulose salt.

3. The method according to claim 1, wherein the water-absorptive polymer is acrylate polymer.

4. The method according to claim 1, wherein the uncured urethane resin is a solvent-free resin.

* * * * *